United States Patent [19]

Eiker, Jr. et al.

[11] 4,257,216

[45] Mar. 24, 1981

[54] ONION CAPSULE HARVESTER AND PROCESS

[75] Inventors: Walter M. Eiker, Jr., Twin Falls; Douglas D. Stutzman, Buhl, both of Id.

[73] Assignee: The Upjohn Company, Kalamazoo, Mich.

[21] Appl. No.: 29,069

[22] Filed: Apr. 11, 1979

[51] Int. Cl.³ ............................................ A01D 91/02
[52] U.S. Cl. ...................... 56/14.6; 56/16.5; 56/DIG. 2; 130/30 H; 171/27
[58] Field of Search ............... 56/DIG. 2, 14.6, 16.5, 56/126-130, 121.44, 121.45; 130/30 R, 30 H; 171/25, 28, 31-35, 40-42, 61, 62, 27

[56] References Cited

U.S. PATENT DOCUMENTS

| | | | |
|---|---|---|---|
| 1,772,971 | 8/1930 | Vaudreuil | 130/30 H |
| 3,296,782 | 1/1967 | Mark et al. | 56/14.6 |
| 3,589,111 | 6/1971 | Gullichson et al. | 56/14.6 |
| 3,597,909 | 8/1971 | Lauridsen, Sr. et al. | 171/41 |
| 3,826,267 | 7/1974 | Scribner | 130/30 H |
| 4,038,809 | 8/1977 | Arnould et al. | 56/14.6 |
| 4,135,580 | 1/1979 | Bouwman | 171/61 |
| 4,178,942 | 12/1979 | Nusser | 130/3 H |

*Primary Examiner*—Jay N. Eskovitz
*Attorney, Agent, or Firm*—Blanchard, Flynn, Thiel, Boutell & Tanis

[57] ABSTRACT

In the process of the invention, the onion stalks are cut and the upper ends thereof are agitated prior to drying thereof to effect removal of the seed capsules from the umbels.

The apparatus of the invention comprises means for cutting the onion stalks and conveying the upper portions thereof with the umbels thereon into one end of a perforated rotating drum. A beater is coaxially and rotatably supported within the drum to agitate the onion stalk portions and thereby separate the seed capsules from the stalks and umbels. The drum and beater are peferably rotated in the same direction, but can be counter-rotated. Said seed capsules fall through the perforations of the drum into appropriate receiving means and the stalks and other debris are discharged from the other end of the drum.

5 Claims, 6 Drawing Figures

ONION CAPSULE HARVESTER AND PROCESS

FIELD OF THE INVENTION

The invention relates to an onion capsule harvesting process and apparatus. In the process of the invention, the onion stalks are cut and removed from seed capsules before they are dry and without appreciable if any damage to the onion seeds in the capsules. The apparatus of the invention comprises means for cutting the onion stalks, beater means for subjecting same to agitation within perforated drum means whereby the capsules are separated from the stalks and fall through the perforations into means for receiving said seed capsules.

BACKGROUND OF THE INVENTION

The harvesting of onion seeds is, of course, a very old art and same has normally been carried out in the past primarily by manual methods. That is, the entire onion umbel and an adjacent part of the stalk have been removed from the plant and dried after which the seeds have been subsequently removed from the seed capsules by any appropriate means. Mechanical devices for harvesting onion seeds have in the past carried out this procedure by harvesting the entire umbel with part of the stalk which is then dried and subsequently threshed to remove the onion seed therefrom. This has necessitated the double handling, whether by hand or mechanical harvesting methods, of the entire umbel. Moreover, the debris from the umbels would have to be removed from the seed during the further handling thereof. This procedure has in the past been believed necessary in order to insure that the seed is properly matured before being separated from the remainder of the plant and further to insure the proper separation thereof.

It has been discovered, however, quite unexpectedly, that it is possible to separate the onion capsules from the umbel prior to the drying thereof so that only the capsules need to be subsequently handled and the stems of the umbels may be discharged as debris along with the remainder of the stalk. Accordingly the time for drying the capsules, by comparison with the time required for drying the capsules plus the adjacent parts of the stalk, is substantially reduced.

Accordingly, the objects of the invention include the provision of:

1. A process for harvesting onion seed wherein the seed-containing capsules are separated from the umbels associated therewith prior to the drying thereof.

2. A process, as aforesaid, which will be effective without injury to the onion seed.

3. A process, as aforesaid, in which the mechanical forces applied to the onion umbels for the separation of seed capsules therefrom are held within ranges of magnitude such that the stems supporting the seed capsules will be ruptured to release the capsules without injury to said seed capsules.

4. A process, as aforesaid, utilizing for the capsule separation step a rotating perforated drum together with a coaxially positioned rotating beater and controlling the relative speeds of said drum and beater to insure effective detachment of the seed capsules from the umbels without injuring said onion seeds.

5. Apparatus for separating seed carrying onion capsules from the umbels carrying same which will effect such separation efficiently without injury to the onion seed.

6. Apparatus, as aforesaid, which will sever the onion stalk from the ground, subject it to suitable agitation for detaching the onion capsules therefrom, will then separate the onion capsules from the stalks and parts associated therewith and discharge said seed capsules into one container while discharging the stalks and other debris elsewhere.

7. Apparatus, as aforesaid, which will be sufficiently sturdy and uncomplicated in structure as to be capable of operating under field conditions for long periods of time without excessive maintenance and without danger of excessive periods of downtime, whether such downtime is for repairs or for maintenance.

Other objects and purposes of the invention will be apparent to persons acquainted with processes and apparatus of this general type upon reading the following specification and inspection of the accompanying drawings.

SUMMARY OF THE INVENTION

The process of the invention is based upon the discovery that the onion seed capsules can be separated from the umbels prior to drying thereof.

The objects and purposes of the invention, including those set forth above, have been met by applying forces to the umbels and capsules carried thereby for effecting separation thereof. This is accomplished by placing the umbels and adjacent parts of the stalks in a rotating drum in which a rotatable beater is mounted. The relative speeds thereof are controlled within a range which will insure effective separation of the capsules from the umbels and will do so without injury to the seeds.

An apparatus for carrying out the process comprises means for cutting the onion stalks and conveying the upper portions thereof to separating means at which point the umbels and stalk portions are introduced into one end of a rotating perforated drum mounted on a substantially horizontal axis and having a beater mounted coaxially therewithin. With proper control of the relative speeds of the drum and beater, the seed capsules are separated from the umbels and are permitted to drop through the perforations in the drum into appropriate receiving means while the stalks and other debris are discharged from the other end of the drum. Thus, only the seed capsules require further processing, and experimental work therewith has shown that the seeds are at this point fully developed so that they can be dried and are then capable of producing completely satisfactory onion plants.

DETAILED DESCRIPTION

The process of the invention has evolved from the discovery that the seed capsules can be separated from the umbels prior to the drying thereof without injury to the seed produced thereby. The capsules are then dried, as by forced or ambient air, and the seeds separated therefrom by any convenient and appropriate threshing procedure.

The process will be more readily understood by reference to the apparatus disclosed hereinafter to carry out the process, it being understood that the apparatus set forth is only illustrative and that such process may be carried out by other apparatus.

Figure 1:
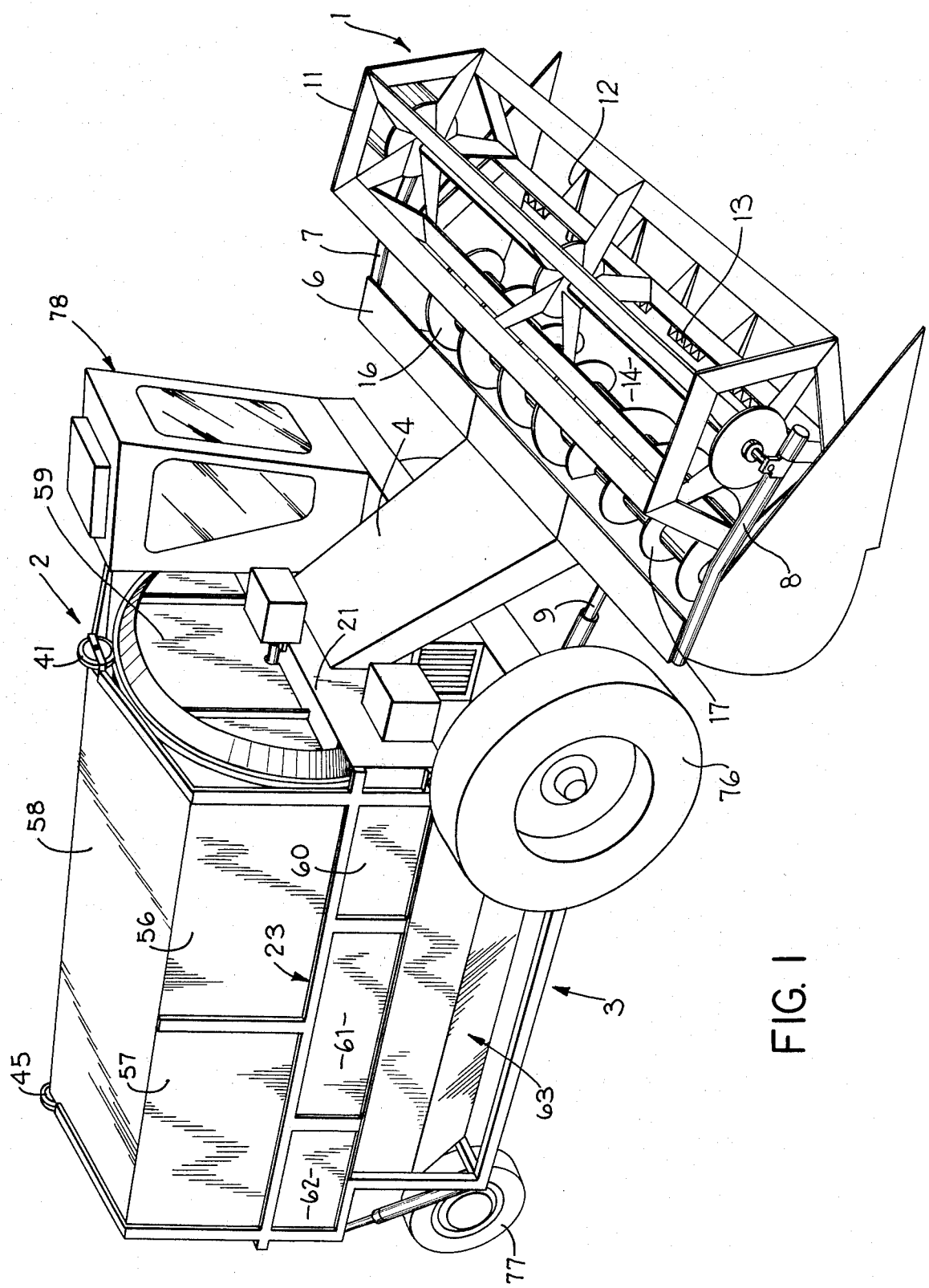
FIG. 1 is a prospective view of apparatus embodying the invention.

A preferred embodiment of the apparatus of the invention which is disclosed in FIG. 1 comprises a severing device 1 mounted in operative association with separating means 2 and the entirety thereof mounted upon a suitable wheeled chassis 3.

Figure 3:
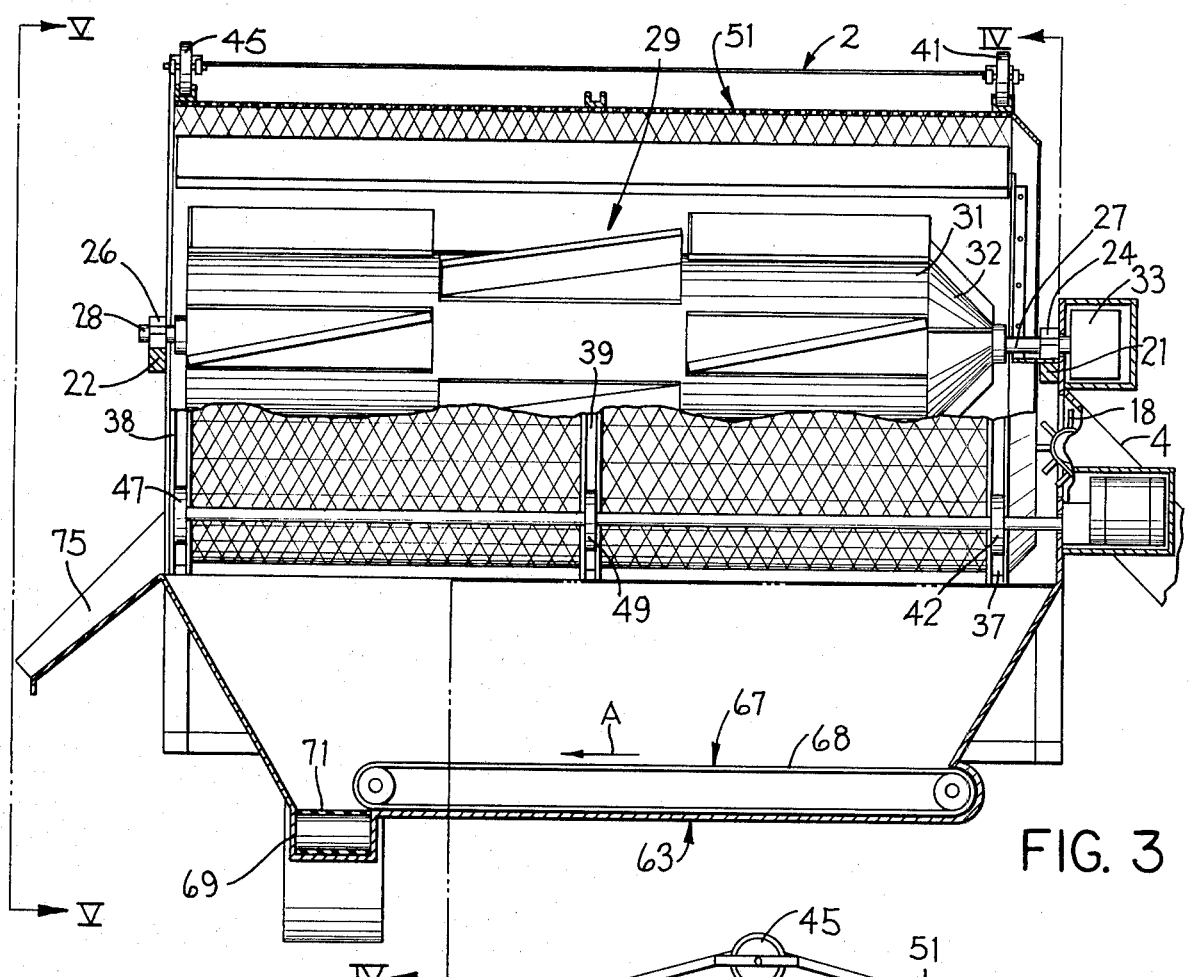
FIG. 3 is a broken and partially centrally sectioned view of the apparatus exposing part of the beater.

The severing mechanism 1 may be of any conventional type by which the onion stalks are severed and the upper portions thereof are delivered through a conveyor housing 4 to the separator 2. In this particular embodiment, a cross member 6, which supports forwardly extending arms 7 and 8, is mounted upon the chassis 3 for vertical adjustment by means including a hydraulic actuator 9. At the front ends of the arms 7 and 8 is rotatably mounted a reel 11 which is driven by any conventional means, not shown, and in operative association with and directly above guide teeth 12 which guide the stalk into the teeth of the cutter bar 13. The portions of the plants severed by said bar are received in a normal manner upon a tray 14 and conveyed from both sides thereof toward the center by rotating worms 16 and 17. The stalk portions are then carried by a conventional endless conveyor 18 (FIG. 3) through the housing 4 and discharged into the separator 2. The cutter 13 and worms 16 and 17 are mounted and driven in any conventional manner.

Inasmuch as the severing mechanism 1, excepting as same cooperates with and relates to the remaining apparatus described hereinafter, is conventional and already well known, it will be easily understood by those skilled in the art so that further description thereof will be unnecessary.

Figure 2:
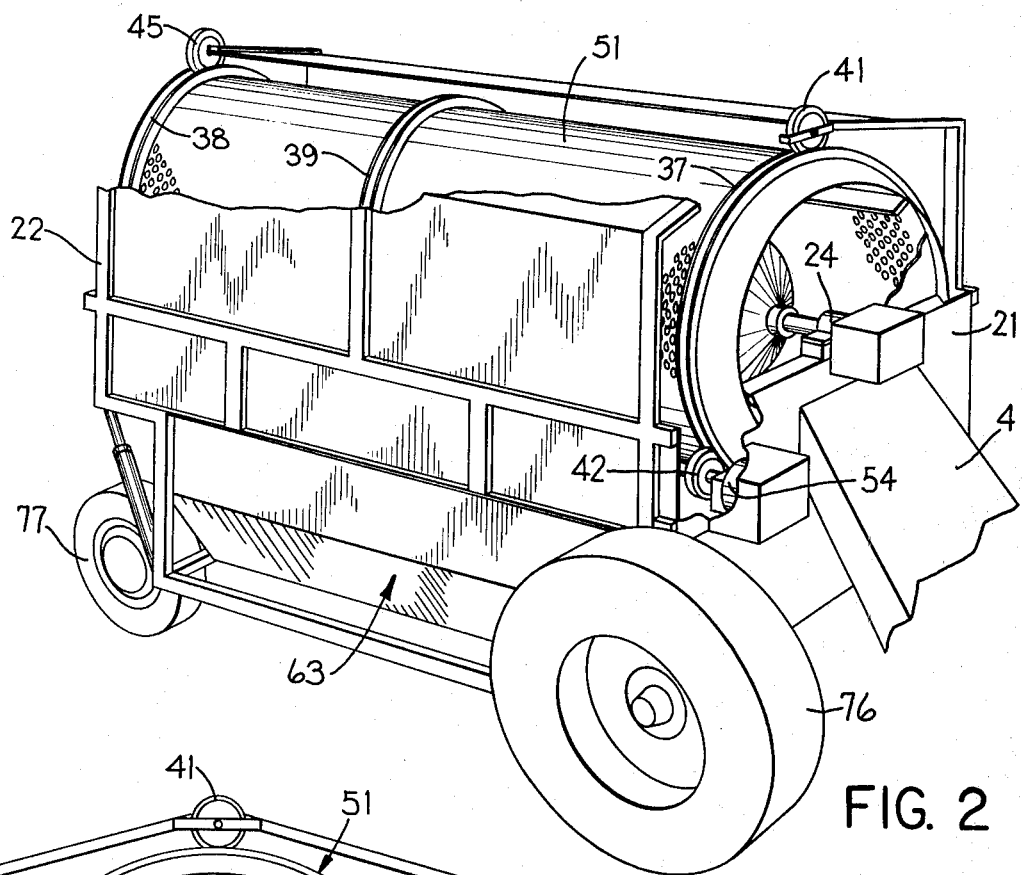
FIG. 2 is a perspective view of the apparatus of FIG. 1 with some of the covering panels removed to expose part of the rotatable mounting of the perforated drum.

The separating means 2 (FIGS. 2 and 3) comprises a front end frame member 21 and a rear end frame member 22 connected to side frame members, one thereof being indicated generally at 23 in FIG. 1, which are mountable on a suitable wheeled chassis 3 as further described hereinafter. Said end frame members support bearings 24 and 26, respectively, in which are rotatably mounted suitable coaxial shafts 27 and 28 connected to and rotatably supporting the opposite ends of the beater 29. Said beater may be of any known type, but in this embodiment comprises a cylinder 31 having a cone 32 closing the upstream or front end thereof and carrying internally any desired frame members, such as spiders, for mounting said drum appropriately onto said shafts 27 and 28. A motor 33, normally hydraulic, may be provided for driving the shaft 27, hence the beater 29, in the direction and at the rotative speed desired. Radially extending and adjustable blades 34, which may be positioned angularly with respect to the axis of said beater, are provided for effecting the agitation of the onion umbels to be processed by the apparatus.

Figure 4:
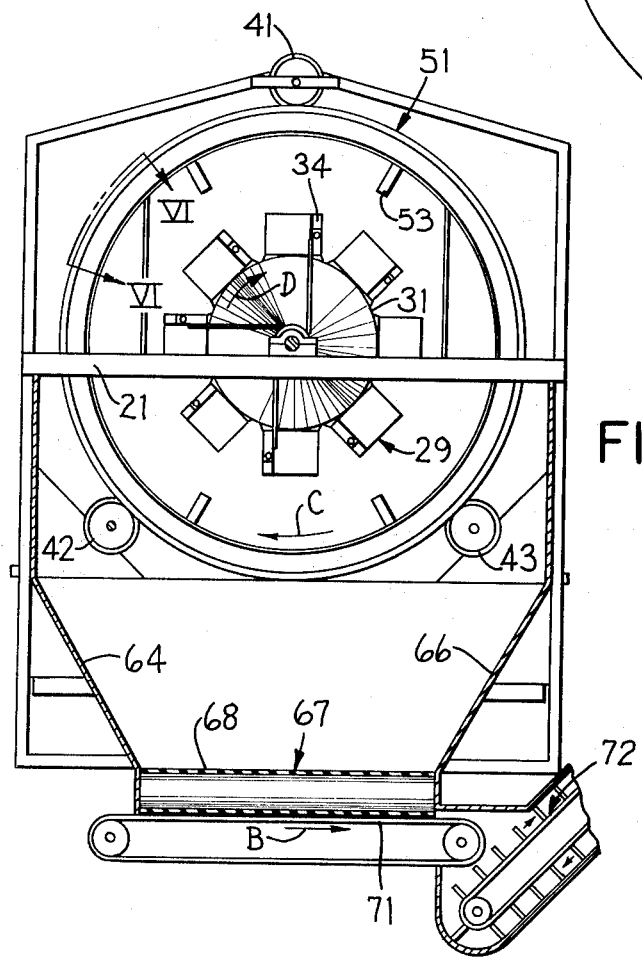
FIG. 4 is a sectional view taken on the line IV—IV in FIG. 3.
Figure 5:
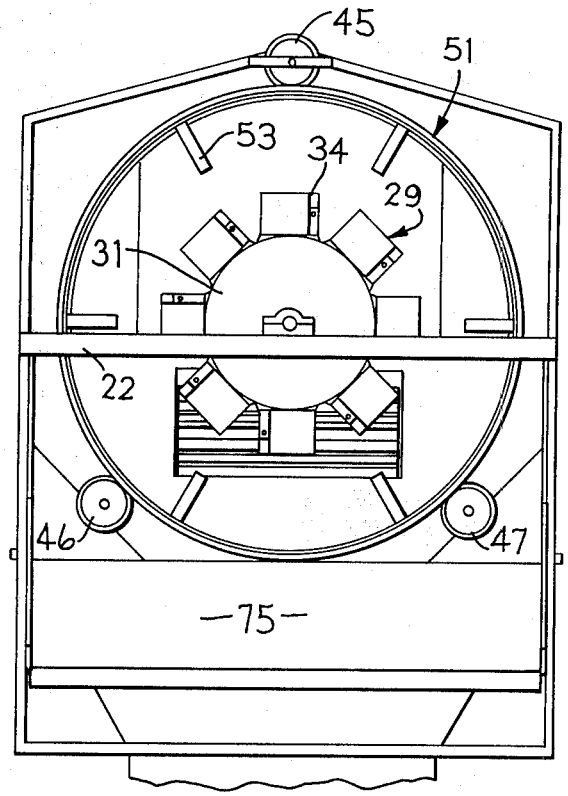
FIG. 5 is a rear end view taken as indicated by the line V—V in FIG. 3.

Mounted suitably within the beater supporting frame is a plurality of rollers for supporting the hereinafter-described perforated drum 51. Three rollers 41, 42 and 43 (FIGS. 2 and 4) are provided adjacent the forward frame member 21 and arranged to support the front end of drum 51. Three rollers 44, 46 and 47 (FIGS. 2 and 5) are provided adjacent the rearward frame member 22 and arranged to support the rear end of drum 51. Two further rollers are desirably provided for supporting the center of the drum 51, and one of these rollers appears at 49 in FIG. 3.

The drum 51 has three channel-shaped tracks 37, 38 and 39 (FIG. 2) in which the rollers 41, 42, 43 and 45, 46, 47 and 49, respectively, are received for rotatably supporting and positioning the drum 51. The rollers 41, 42 and 43 are preferably spaced equidistantly around the drum, as are the other rollers. Additional rollers and/or tracks may be provided.

Figure 6:
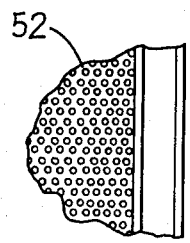
FIG. 6 is a fragmentary sectional view taken on the line VI—VI in FIG. 4.

The drum 51 is rigid and has closely spaced perforations 52 (FIG. 6) which are of such size as to pass the onion seed capsules readily but to prevent passage of the capsule supporting debris, such as stalks and most of the capsule supporting stems normally accompanying same. In a preferred construction, the perforations in the drum may be from about ½ inch to 9/16 inch in diameter.

Said drum 51 has radially inwardly directed vanes or cleats 53 carried thereon for improving the agitation of the onion stalks and umbels whereby the seed capsules are separated from the stalks. Inasmuch as the stalk mass will be rather substantial, a sufficient distance is provided between the circle defined by the inner edges of the vanes 53 and the outer edges of the beater blades 34 to effect a good beating action, as opposed to a grinding action, so as to avoid injury to the capsules as they pass between the vanes and blades.

In a selected embodiment, the drum 51 is about 5 feet in diameter and is rotated from 8 to 12 rpm. The vanes 53 are rigidly secured to the drum 51 and extend radially inwardly therefrom about 6 inches. The beater 29 has an outside diameter of about 2½ feet and it can be rotated at speeds ranging from 100 rpm to 300 rpm, such speed being dictated by the condition and/or quantity of the stalks being handled thereby. The radial distance between the outer edges of the blades 34 and the inner edges of the vanes 53 is about 9 inches. However, the radial extent of the blades is adjustable so that said clearance can be reduced.

A motor 54, in this case a conventional hydraulic motor, is connected by shaft means to three aligned rollers, as the rollers 42, 47 and 49, for driving the drum 51 at a selected speed and in a selected direction.

Appropriate panels, such as the panels 56–62, are provided in any convenient manner for support upon the frame structure and for covering said drum.

An elongated trough 63 (FIGS. 1 and 3) having downwardly converging sides 64 and 66 (FIG. 4) is provided under the drum 51 for receiving seed capsules dropping therethrough. A convenient conveyor means 67 may be provided within said trough for moving said capsules to a desired point of discharge. In the illustrated embodiment, said trough 63 contains an endless conveyor 67 operable so that its upper course 68 moves in the direction of arrow A (FIG. 3) and discharges onto a conveyor 69. The upper course 71 (FIG. 4) moves in the direction of arrow B (FIG. 4) and discharges onto a lifting conveyor 72. Conveyor 72 discharges at the side of the machine in any desired manner into receptacles such as bags or baskets, not shown. All of said conveyors may be driven at selected speeds by conventional means, such as hydraulic motors, not shown.

The apparatus thus far described may be mounted upon any convenient chassis 3 provided with supporting wheels of which two are shown at 76 and 77. Said chassis 3 is operatively associated with a suitable prime mover, such as a gasoline engine not shown, and operated through conventional steering and control means from a cab 78. In one effective embodiment of the invention, the chassis 3 was modified from a conventional combine with conventional combine steering and control means operable from within the cab 78.

Conventional hydraulic pump means (not shown) driven by said engine provides the hydraulic fluid under pressure which is required for driving the severing means 1, the separating means 2 and the several conveyors 67, 71 and 72. Since such combine and hydraulic means are substantially conventional and well known to those skilled in the art, no further detailing thereof would be helpful.

OPERATION

While the operation of the apparatus has been indicated above, it will be reviewed briefly hereinafter for convenience.

With the engine of the apparatus operative to move the onion capsule harvester as desired, the hydraulic means are also pressurized to operate the various motors and devices driven thereby. Thus, with the apparatus moving rightwardly, as shown in FIG. 1, the onion stalks will be cut by the cutter bar 13 in the usual manner and moved rearwardly by the reel 11 onto the tray 14. The severed stalks will then be moved centerward by the worms 16 and 17 and carried up through the housing 4 by the conveyor 18 and dumped into the inlet end of the drum 51. With the drum rotating in one direction, such as that indicated by the arrow C in FIG. 4, and with the beater 29 rotating in the same direction, such as that indicated by the arrow D in FIG. 4, the onion stalks including the umbels and seed capsules therewith will be sufficiently agitated as to separate the seed capsules from the stalks. The rotative speed of said drum is relatively slow, namely about 8 to 12 rpm, while the rotative speed of the beater 29 is substantially higher such as 100 to 300 rpm. This speed differential, wherein the beater operates at a rotational speed of from about 25 to about 35 times greater than that of the drum, appears to be of considerable importance in effecting proper separation of the seed capsules from the stalks.

The vanes 53 serve to raise the stalks to the upper zone within the drum from which they then fall into the upper part of the path of the beater blades so as to effect a maximum beating action.

The seed capsules will drop through the perforations 52 in the drum and into the trough 63 while the stalks and other debris will be urged by the angled positioning of the blades 34 rearwardly to the leftward (as appearing in FIG. 3), or outlet, end of the drum 51 to be discharged into the chute 75 and in this case onto the ground. In the meantime, the onion capsules are directed by the sides 64 and 66 of the trough 63 onto the rearwardly moving conveyor 67 to the conveyor 71, thence to the conveyor 72 and from and by the conveyor 72 into whatever receptacles, bags, baskets or otherwise may be provided.

Even though the seed capsules are not fully dry at this point, it has been found that they are in fact fully matured so that the onion plants produced therefrom are in all respects fully satisfactory.

The machine as described avoids the considerable handling of onion stalks and umbels previously required of either hand or machine operations when it was believed that same had to be dried before separating from the umbels in order to assure the seeds being fully matured when so separated. Thus, by this method and machine, it is no longer necessary to handle the stalks and umbels after this machine has discharged them, as onto the ground, with a substantial and self-evident saving in time and expense. Moreover, the debris, such as stalks, do not have to be dried in order to dry the seeds.

The capsule harvester can be operated effectively and efficiently at speeds up to 1½ miles per hour under normal conditions and thereby handle a large acreage of onions whose seed is reaching the harvesting stage.

When both the drum 51 and beater 29 are rotated in the same direction, the ratio of the speed of the beater to that of the drum is desirably between 10 to 1 and 35 to 1. The direction of rotations of the drum and beater, shown clockwise in FIG. 4, may be in either direction provided that the cleats 53 are positioned so as to urge the stalks rearwardly (leftwardly in FIG. 3). Also, the drum 51 and beater 29 may be counter-rotated provided that appropriate adjustments are made in their rotative speeds.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In the process of harvesting onion seed, comprising the steps of:
   severing the umbels from the ground-attached remainder of the onion plant;
   collecting such severed umbels into a mass;
   agitating said mass and thereby separating the seed-containing capsules from said umbels;
   subsequently drying said capsules and separating the seeds therefrom.

2. In the process of harvesting onion seed, comprising the steps of:
   severing the umbels from the remainder of the ground-attached onion plant and collecting said umbels into a mass;
   introducing said mass into a perforated drum rotating at a first rotative speed;
   agitating said mass by rotatable agitator means located within said drum and rotating at a second rotative speed faster than the rotative speed of said drum and thereby separating the seed capsules from said umbels;
   collecting the seed capsules so separated and subsequently drying same.

3. The method of claim 2 wherein said rotatable agitator means is coaxial with said drum.

4. The method of claim 2 wherein said rotatable agitator means rotates in the opposite rotational direction to that of said drum.

5. The method of claim 2 wherein said rotatable agitator means rotates at a speed of from about 25 to about 35 times faster than that of said drum.

* * * * *